United States Patent
Budinski et al.

(10) Patent No.: US 9,065,086 B2
(45) Date of Patent: Jun. 23, 2015

(54) THERMOPLASTIC BIPOLAR PLATE

(75) Inventors: Michael K. Budinski, Pittsford, NY (US); Timothy J. Fuller, Pittsford, NY (US); Beba T. Dobulis, Fairport, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 2494 days.

(21) Appl. No.: 11/765,067

(22) Filed: Jun. 19, 2007

(65) Prior Publication Data

US 2008/0318110 A1 Dec. 25, 2008

(51) Int. Cl.
*H01M 8/00* (2006.01)
*H01M 8/02* (2006.01)

(52) U.S. Cl.
CPC ........ H01M 8/0221 (2013.01); *Y10T 29/49115* (2015.01); *H01M 8/0206* (2013.01); *H01M 8/0213* (2013.01); H01M 8/0228 (2013.01); *Y02E 60/50* (2013.01)

(58) Field of Classification Search
USPC ......... 429/452, 545, 456–463, 466, 467–470, 429/516–521, 535; 427/115
See application file for complete search history.

(56) References Cited

U.S. PATENT DOCUMENTS

| | | | | |
|---|---|---|---|---|
| 4,125,680 A | * | 11/1978 | Shropshire et al. | 429/4 |
| 5,882,721 A | * | 3/1999 | Delnick | 427/77 |
| 6,554,944 B1 | * | 4/2003 | Peters et al. | 156/245 |
| 6,794,078 B1 | * | 9/2004 | Tashiro et al. | 429/492 |
| 2002/0034672 A1 | * | 3/2002 | Saito et al. | 429/34 |
| 2002/0180088 A1 | * | 12/2002 | Hashiguchi et al. | 264/102 |
| 2003/0087143 A1 | * | 5/2003 | Nakanishi et al. | 429/35 |
| 2005/0031933 A1 | * | 2/2005 | Blunk et al. | 429/35 |
| 2005/0037935 A1 | * | 2/2005 | Abd Elhamid et al. | 510/175 |
| 2005/0121653 A1 | * | 6/2005 | Chacko | 252/500 |
| 2005/0238941 A1 | * | 10/2005 | Nishi et al. | 429/38 |
| 2007/0142547 A1 | * | 6/2007 | Vaidya et al. | 524/847 |

FOREIGN PATENT DOCUMENTS

| | | |
|---|---|---|
| DE | 10219384 A1 | 11/2003 |
| DE | 10330832 A1 | 2/2004 |

OTHER PUBLICATIONS

Oxford English Dictionary—Thermoforming (2012).*
Carfora, Joe ("Latest Thermoset Developments for Fuel Cells", Proceedings of the "Imagination & Implementation—Thermosets 2004" SPE Topical Conference, 2004).*

* cited by examiner

*Primary Examiner* — Barbara Gilliam
*Assistant Examiner* — Stephan Essex
(74) *Attorney, Agent, or Firm* — Quinn Law Group, PLLC

(57) ABSTRACT

A method of manufacturing a fuel cell bipolar plate comprising first and second thermoformed plates. The thermoformed plates comprise at least one thermoplastic polymer. The method includes providing film cast resin mixture and forming it into a substantially flat sheet having first and second opposing major surfaces. The sheet may be preheated to a predetermined temperature and thermoformed thereby creating separator plates of a desired size and shape. First and second plates are joined to form an integral bipolar plate.

12 Claims, 5 Drawing Sheets

THERMOPLASTIC BIPOLAR PLATE

FIELD

The present disclosure relates to fuel cells, and more particularly to bipolar plates and methods of making the same.

BACKGROUND

The statements in this section merely provide background information related to the present disclosure and may not constitute prior art.

Electrochemical cells, such as fuel cells, generate electrical power through the electrochemical reaction of a reactant and an oxidant. An exemplary fuel cell has a membrane electrode assembly (MEA) with catalytic electrodes and a proton exchange membrane (PEM) sandwiched between the electrodes. In preferred PEM type fuel cells, hydrogen is supplied as a reductant (or fuel) to an anode, and oxygen is supplied as an oxidant to a cathode. PEM fuel cells reduce oxygen at the cathodes and generate an energy supply for various applications, including vehicles.

Bipolar PEM fuel cells comprise a plurality of MEAs stacked together in electrical series. Typically, each MEA is sandwiched between a pair of electrically conductive contact elements, preferably bipolar plates that serve as current collectors for the anode and cathode. Generally, the bipolar plates comprise two independent plates, preferably having a void between them for coolant flow. The bipolar plates may also contain appropriate channels and openings thereon for distributing the fuel cell's gaseous reactants (i.e., $H_2$ and $O_2$/air) over the surfaces of the respective anode and cathode.

Polymer composite materials are desirable for bipolar plates, as they are chemically inert and generally do not comprise iron-containing contaminates. Presently, bipolar plates are made from thermosetting polymers in a compression molding process. The compression molding process is slow and expensive, with substantial tooling costs. Further, thermosetting polymers cannot be joined by ultrasonic or laser welding, requiring costly thermosetting adhesives to be used to join halves of a bipolar plate. Thus, there remains a need for a method of manufacturing bipolar plates at a high volume production that avoids problems associated with known processes and improves bipolar plate performance, efficiency, and lifespan in the fuel cell.

SUMMARY

The present disclosure describes a method of manufacturing a bipolar plate. In one embodiment, the method includes forming a resin mixture including a thermoplastic polymer, an electrically conductive material, and an appropriate solvent. The mixture may be mechanically blended to disperse the electrically conductive material and to attain a desired viscosity. The resulting mixture may be cast into a substantially flat sheet to form a film having first and second opposing major surfaces. A portion of at least one of the surfaces may be abraded by etching or scuffing. The sheet may be preheated for a predetermined temperature and time. The preheated sheet is then thermoformed against a mold. The thermoformed sheet may be cut and sized into separator plates as desired, and two separator plates are joined into an integral bipolar plate.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates a possible variation of at least that which may arise from ordinary methods of measuring such a value.

Further aspects and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
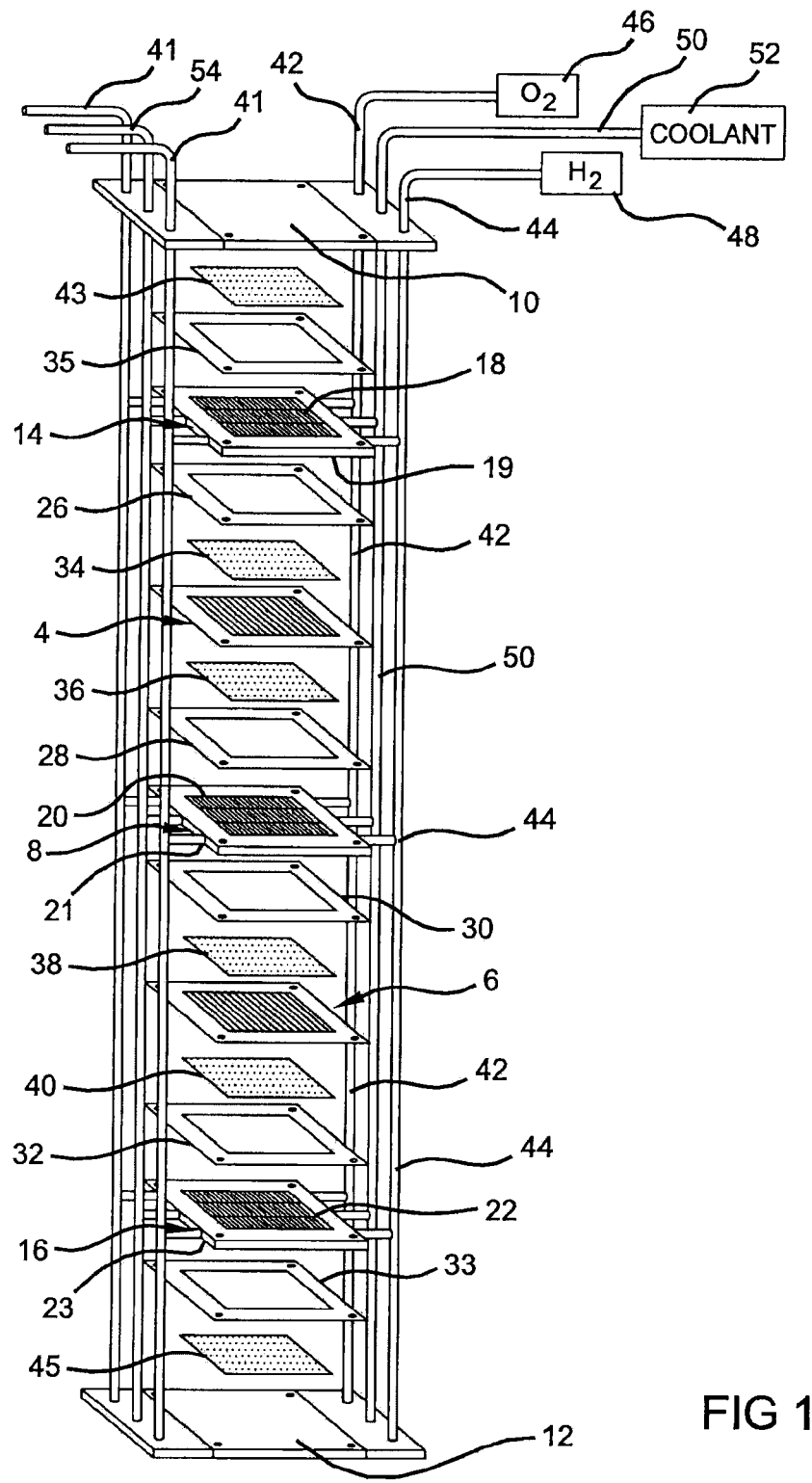
FIG. 1 is a schematic, exploded, isometric illustration of an exemplary liquid-cooled PEM fuel cell stack (only two cells shown)

The manufacturing of fuel cells is simplified and more accurate through the use of various subassemblies, one of which is a bipolar plate of the disclosure. To gain a better understanding of the present bipolar plate and method, an exemplary fuel cell is shown in FIG. 1, which depicts two individual proton exchange membrane (PEM) fuel cells connected to form a stack having a pair of membrane electrode assemblies (MEAs) 4, 6 and gas diffusion media 34, 36, 38, 40 separated from each other by an electrically conductive, liquid cooled, bipolar separator plate or conductive element 8. In a stack, a preferred bipolar separator plate 8 typically has two electrically active sides 20, 21 within the stack, each active side 20, 21 respectively facing a separate MEA 4, 6 with opposite charges that are separated, hence the so-called separator, or "bipolar" plate. The fuel cell stack is described herein as having conductive bipolar plates that serve to collect the current produced by the fuel cell.

The MEAs 4, 6 and bipolar plate 8 are stacked together between stainless steel clamping terminal plates 10, 12 and end contact fluid distribution elements 14, 16. The end fluid distribution elements 14, 16, as well as both working faces or sides 20, 21 of the bipolar plate 8, contain a plurality of lands adjacent to grooves or channels on the active faces 18, 19, 20, 21, 22, and 23 for distributing fuel and oxidant gases (e.g., $H_2$ and $O_2$) to the MEAs 4, 6. Nonconductive gaskets or seals 26, 28, 30, 32, 33, and 35 provide a seal and electrical insulation between the several components of the fuel cell stack. Gas permeable conductive diffusion media 34, 36, 38, and 40 press up against the electrode faces of the MEAs 4, 6. Additional layers of conductive media 43, 45 are placed between the end contact fluid distribution elements 14, 16 and the terminal collector plates 10, 12 to provide a conductive pathway there between when the stack is compressed during normal operating conditions. The end contact fluid distribution elements 14, 16 press up against the diffusion media 34, 43 and 40, 45 respectively.

Oxygen, compressed air, or another oxidant gas is supplied to the cathode side of the fuel cell stack from storage tank 46 via appropriate supply plumbing 42, while hydrogen or another fuel gas is supplied to the anode side of the fuel cell from storage tank 48 via appropriate supply plumbing 44. Alternatively, air may be supplied to the cathode side from the ambient and hydrogen to the anode from a methanol, methane or gasoline reformer, or the like. Exhaust plumbing 41 for both the $H_2$—$O_2$/air sides of the MEAs is also provided. Additional plumbing 50 is provided for circulating coolant from a storage area 52 through the bipolar plate 8 and end plates 14, 16 and out the exit plumbing 54.

During fuel cell operation, the anode hydrogen gas ($H_2$) is split into two protons ($H^+$), thus freeing two electrons. The protons migrate across the membrane of the MEA 4, 6 to the cathode side. The oxygen or air introduced at the cathode side flows into the porous electrode. Catalyst particles within the cathode facilitate a reaction between the protons ($H^+$) and oxygen ($O_2$), to form water within the electrode. Thus, as liquid water is generated, the gas flow into the porous cathode material must simultaneously be maintained. Otherwise the electrode has the potential to "flood" with liquid. Flooding impedes gas flow to the PEM through the MEA 4, 6 in effect decreasing or ceasing any reactions occurring at the MEA 4, 6. One preferred embodiment provides the fluid distribution element adjacent to the cathode that facilitates water and cathode effluent transportation away from the cathode, while further humidifying the PEM, and, in some embodiments, even cooling the fuel cell.

As recognized by one skilled in the art, the bipolar plates of the present disclosure may vary in design, such as, for example, in the configuration of the flow fields, placement, and number of fluid delivery manifolds, and the coolant circulation system. However, the function of conductance of electrical current through the surface and/or body of the bipolar plates function similarly with all designs.

Figure 2:
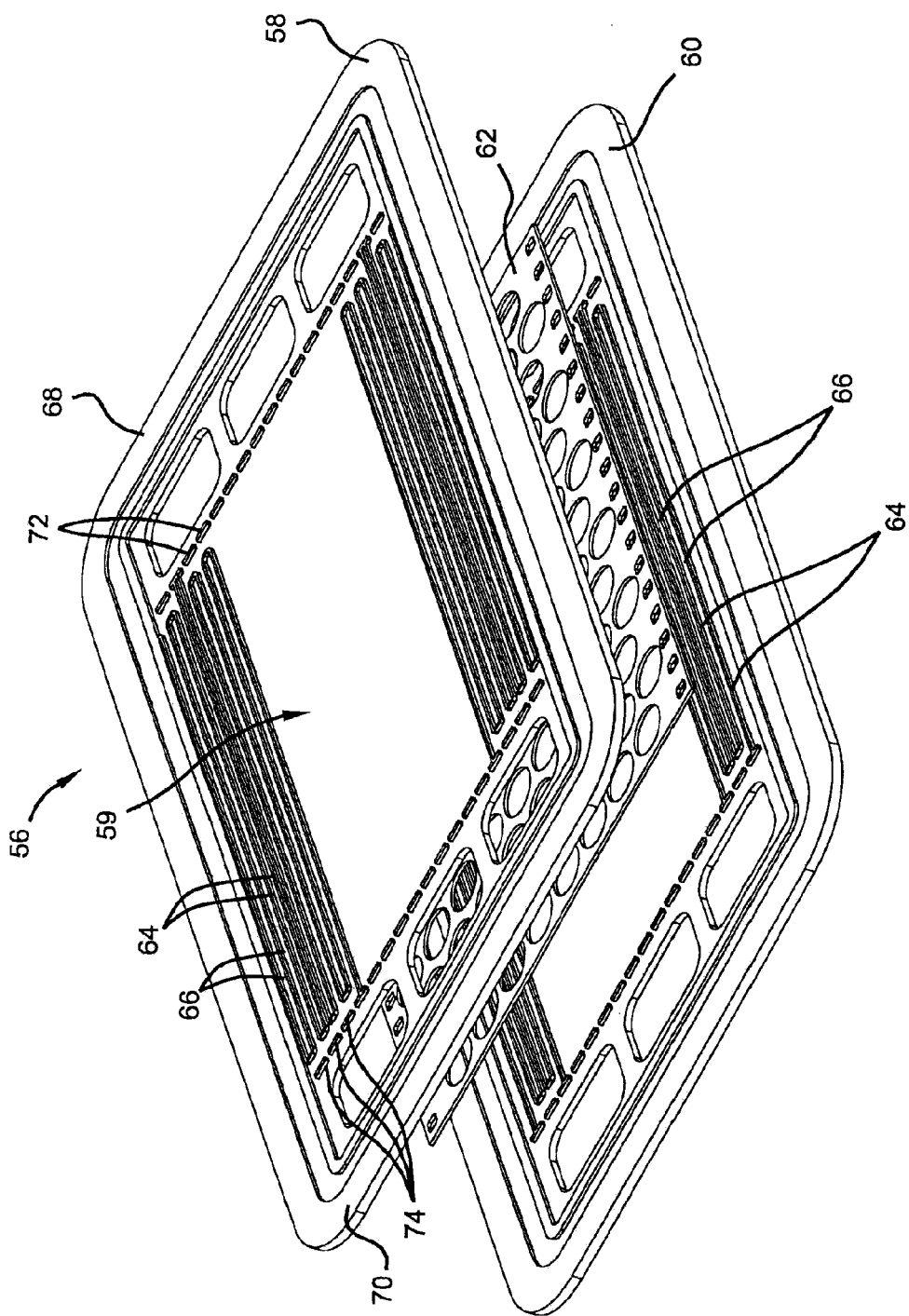
FIG. 2 is an exploded, isometric view of a bipolar plate of the PEM fuel cell stacks as illustrated in FIG. 1.

FIG. 2 is an isometric, exploded view of a bipolar plate 56 comprising a first exterior separator plate, or piece 58, a second exterior separator piece 60, and an optional interior spacer sheet 62 interjacent the first piece 58 and the second piece 60. It should be understood that, in certain embodiments, the bipolar plate may be unitary or monolithic. The external pieces 58, 60 each have working surfaces 59 on the outside thereof that confront an MEA (not shown) and are formed with a plurality of lands 66 that define there between a plurality of grooves 64 known as a "flow field" through which the fuel cell's reactant gases (e.g., $H_2$ or $O_2$) flow in a tortuous path from one side 68 of the bipolar plate to the other side 70. When the fuel cell is fully assembled, the lands 64 press against carbon/graphite paper gas diffusion media (such as 36 or 38 of FIG. 1) which, in turn, press against the MEAs (such as 4 or 6 in FIG. 1, respectively). For drafting simplicity, FIG. 2 depicts only two arrays of lands 66 and grooves 64. In reality, the lands and grooves 66, 64 will generally cover the entire external surfaces of the separator pieces 58, 60 that engage the diffusion media. The reactant gas is supplied to grooves 64 from one header or manifold groove 72 that lies along one side 68 of the fuel cell, and exits the grooves 64 via another header/manifold groove 74 that lies adjacent the opposite side 70 of the fuel cell.

The present disclosure provides a method of manufacturing a bipolar plate with thermoplastic material. The method includes thermoforming first and second separator plate sections 58, 60 and joining them together to form a single bipolar plate 56 having an integral body. The plate sections may be formed as individual components or may be formed in one continuous sheet that is cut and sized into multiple plates. In general, thermoforming is a process that involves preheating a flat sheet or web of plastic and bringing it into contact with a mold whose shape it will take as a result of vacuum, compression, and/or direct mechanical force. Thermoforming is familiar to those of ordinary skill in the art and is described in various references, such as the Encyclopedia of Polymer Science and Engineering, volume 16, second edition, published by John Wiley & Sons, 1989, which discusses different thermoforming processes and the use of roll-fed, sheet-fed, in-line extrusion, and continuous web-fed systems. All of these may be employed to manufacture the plates used to form the bipolar plate of the present disclosure, as can different thermoforming tools that are described in the technical literature, such as film casting, rod coating, flat forming, and rotary devices, these devices being available for use with various thermoforming techniques such as matched mold forming, plug-assist forming, basic vacuum forming, and pressure forming.

The thermoforming process typically relies on the use of both heat and pressure to deform a thermoplastic material into a predetermined shape, and the resulting product is sometimes called a "thermoform." The heat may be provided by the mold itself, a preheater, a press, an extruder, or other tooling as is known in the art. In any event, a cast film, extruded film, or polymeric web, is heated sufficiently to permit thermoforming. The temperature to which the polymeric web must be heated varies over a broad range depending in part on the gauge and type of material that is being thermoformed as well as the speed of the manufacturing line. For example, typically the temperature is heated above the $T_g$ for amorphous polymers, and just above the $T_m$ for semi-crystalline polymers. The applied pressure would be sufficient to permit a high quality replication of the mold or die pattern and may be provided by, for example, the force the mold exerts upon the web when the mold closes, or by the application of a vacuum that urges the web to deform over a male die or draws the web into a female die (i.e., vacuum thermoforming). The web is typically cooled after thermoforming, which may be accomplished by air cooling, fans, a water bath, or a cooling oven until the thermoplastic polymer hardens. In certain aspects, tooling may be used that is cooled with cold nitrogen from a liquid nitrogen source. The tooling may comprise highly conductive materials such as beryllium-copper.

Figure 3:
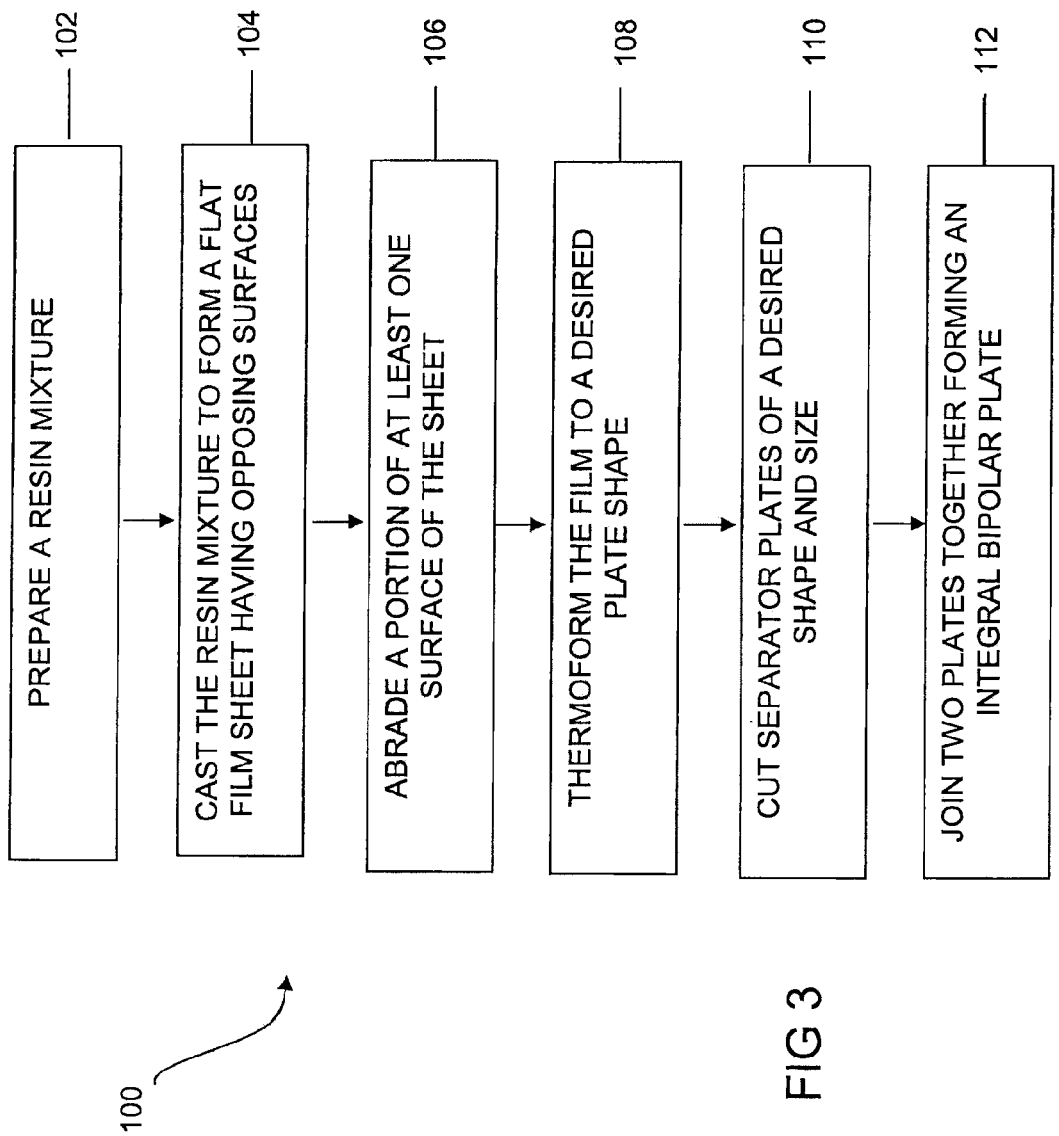
FIG. 3 is a flow diagram of a method of manufacturing a bipolar plate according to the principles of the present disclosure.

Referring now to FIG. 3, a highly simplified method of manufacturing a bipolar plate assembly according to the principles of the present disclosure is illustrated schematically as referenced generally by the number 100. A mixture is prepared including an appropriate thermoplastic polymer as indicated by method box 102. The selection of the polymer materials of construction includes weighing such parameters as overall density (mass and volume); durability, flexibility, strength, and toughness for handling; electrical resistance; and corrosion and oxidation resistance within the fuel cell environment.

Non-limiting examples of thermoplastic polymers presently preferred for use with the present disclosure include: polycarbonate (PC), polyphenylene oxide (PPO), polystyrene (PS), polyvinyl chloride (PVC), polyvinylidene chloride (PVDC), acrylonitrile butadiene styrene (ABS), polymethyl methacrylate (PMMA), cellulose acetate (CA), cellulose acetate butyrate (CAB), cellulose acetate phthalate (CAP), polyamide-imide (PAI), polyamide (PA), polyethylene terephthalate (PET), and polyetherimide (PEI), polyphenylene sulfide (PPS), polypropylene (PP), poly-1-butene (PB), polybutylene terephthalate (PBT), and mixtures thereof.

The polymer resin is dissolved in an appropriate solvent in an amount to provide a viscosity suitable for casting a film sheet. Non-limiting examples of such solvents include methylene chloride, toluene, tetrachloroethane, dichloroethane, tetrahydrofuran, glyme, diglyme, and the like. The solvent is typically provided in an amount between about 1 and about 50 wt. % polymer solids per combined weight of polymer and liquid; and preferably between about 5 and about 20 wt. % polymer and filler solids per combined weight of filler, polymer, and liquid. The ratio of the weight of filler to the combined dry weight of polymer solids and filler is typically less than about 80 wt. %, and this may depend on processing conditions. The liquid may preferably be a solvent for the polymer, and may or may not be a solvent for the filler material. Exemplary purposes of the liquid include helping to disperse a conductive filler uniformly into the polymer, and to aid in processing a sheet of material which may be thermoformed after or during solvent removal. The solvent is preferably removed before the thermoformed plate is used in a fuel cell.

Suitable solvent mixing equipment may be used including jar roll mills with appropriate grinding media such as zirconia or glass beads, attritors (such as those made by Union Process), microfluidizers (such as those made by Microfluidics), homogenizers (such as those supplied by Niro-Soavi Engineering), and planetary mixers. Optionally, filler may be dispersed into the thermoplastic polymer by well-known melt-mixing equipment such as extruders, rubber roll mills, Banbury mixers, and the like.

In various embodiments, electrically conductive filler materials may be dispersed in the resin mixture and are subsequently disposed throughout the working surfaces 59 of the exterior separator pieces 58, 60 to better enable electrical conductivity through the flow field regions. For example, conductive filler materials may be added to the resin mixture to form a conductive composite matrix. Such conductive filler materials may comprise particles, fibers, woven materials, cloth, and the like. Preferred conductive filler materials may include: gold, platinum, graphite, carbon, nickel, conductive metal borides, nitrides and carbides (e.g., titanium nitride, titanium carbide, titanium diboride), titanium alloys containing chromium and/or nickel, palladium, niobium, rhodium, rare earth metals, and other noble metals. Preferably, the conductive filler materials may comprise carbon; graphite; expanded graphite; conductive carbon cloth, paper, or mat; or combinations thereof. One such example of expanded graphite includes EG15, produced by SGL Polycarbon, Inc. of Valencia, Calif., having graphite particles 90% of which are less than 70 microns. An example of a conductive cloth includes commercially available TORAY® graphite-fiber paper made by Toray Carbon Fibers America, Inc. The conductive filler materials may comprise varying volumetric ranges of the overall polymer and conductive material matrix, ranging from about 1 to about 80%, or more, of conductive particles per total volume. The conductive filler materials may include fibers as well as particulates to enhance percolation. In various embodiments, the flow field regions of the separator plates are conductive and the header region may be non-conductive.

In various embodiments, conductive polymers may be used as fillers. Non-limiting examples of conductive polymers include sulfonated lignin or otherwise acid-doped polyanilines (Ligno-Pani), polythiophenes, and polypyrrole, as well as their derivatives.

In certain embodiments, the fillers may be milled with solutions of the polymer in order to obtain a good dispersion of the filler in the polymer. The solvent is subsequently removed. Other methods of dispersing fillers into polymers include melt extrusion, melt processing with Banbury mixers or rubber roll mills, or solution processing with mixing and grinding mills (e.g., jar roll mills), homogenizers or microfluidizers.

Once the resin mixture is prepared, it may be mechanically stirred. The mixture may be ball milled, for example, to wet out the filler and to attain a desired casting viscosity depending on the amount of solvent provided. It should be noted that the appropriate physical conditions, including the temperature, pressure, and time are selected based on the specific polymer components used, and the overall geometry and complexity of the bipolar plates. For illustrative purposes and as a non-limiting example, virgin polycarbonate polymer may be dissolved in methylene chloride at a ratio of about 1:13 parts by weight. About 1 part by weight expanded graphite powder may be added to the resin mixture (for a total of about 50 wt. % filler based on total solids) which may then be ball milled for about 4 hours, or longer, to provide a mixture with a resulting viscosity of between about 100 to about 2,000 centipoise, preferably between about 100 to about 1,000 centipoise.

Once the resin mixture has a desired viscosity, the mixture may be cast into a film or a substantially flat sheet having first and second opposing surfaces. The mixture may be cast by any suitable method as is known to those skilled in the art as depicted by method box 104. One typical casting process includes rod coating the resin onto a substrate such as glass or a Teflon® coated substrate. The dimensions of the film may be as large as the equipment allows. For example, thermal presses over 6 feet long are routinely used to compression-mold certain substrates such as countertops.

Many molded parts are abraded, etched, and/or scuffed after formation in order to reduce any interfacial electrical contact resistance. Accordingly, a frictional mechanical force may be applied to a portion of at least one of the first and second opposing surfaces of the sheet as depicted by method box 106. Typically, the surface of the sheet may be lightly etched, scuffed, or scrubbed using an appropriate abrasive scrubbing pad, such as commonly available Scotch-Brite pads. In many instances, scrubbing may markedly improve conductivity and performance. Other similar methods of cleaning the surface of the molded part might also be used in addition to or in combination with the frictional mechanical force. Such non-limiting examples may include the use of surface films, acid etching, solvent etching, plasma etching, flame treating, flash lamp ablation, and the like.

Once the sheet is etched, scuffed, and/or scrubbed, it may be preheated as previously discussed in order to aid in the removal of any dissolved water and/or moisture that may be present. Typical preheating may include heating the sheet to a temperature between about 100° to about 130° C., for about 1 hour to about 3 hours. As should be understood, the temperature and time period for the preheating step may vary depending upon the materials selected and all such suitable variations are considered within the scope of the present disclosure.

After the sheet is preheated, the temperature is increased and the sheet is thermoformed to a desired shape via any suitable method as previously discussed and as depicted by method box 108. After a suitable cooling process, the resulting thermoformed sheet may be cut into separator plates of a desired size and shape appropriate for use in a PEM fuel cell as depicted by method box 110. Two of the plates may then be joined together to form an integral conductive bipolar plate as depicted by method box 112. As is known in the art, the plates may be joined using typical methods of joining thermoplastic materials including solvent joining, laser joining, ultrasonic welding, laser welding, thermal staking, adhesive bonding, and combinations thereof.

Compositions and methods among those of the present disclosure are exemplified by the following non-limiting examples.

Example 1

Figure 4:
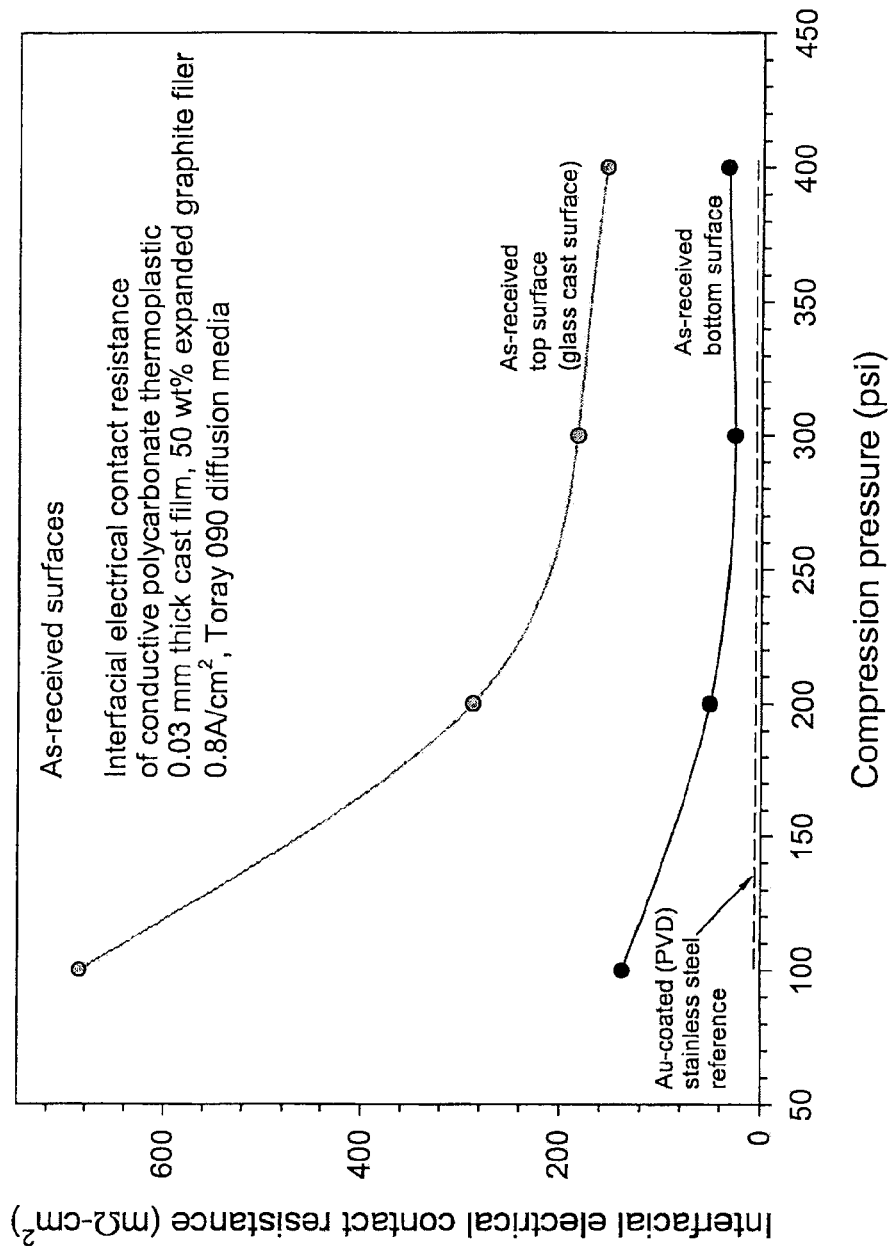
FIG. 4 illustrates the interfacial electrical contact resistance as a function of contact pressure for an as-cast polycarbonate composite bipolar plate.

Expanded graphite powder (EG-15, 5 grams, SGL Polycarbon, Inc., Valencia, Calif.) is added to polycarbonate (5 grams, Scientific Polymer Products, Ontario, N.Y.) in methylene chloride (65 grams) in a screw-cap jar (125 milliliters). Glass beads (80 grams, 5 millimeter diameter, soda-lime) were added and the jar is secured and placed on jar roll mill for about four hours. The back solution is decanted off from the glass beads and is draw bar coated onto float glass (8.5 inches by 8.5 inches) using a 6-inch wide Bird applicator bar with a 0.25-millimeter gap set with 2-pieces of masking tape as spacers. After drying at 23° C., the coated film is about 120 micro-meters thick. The film is dried for about 2 hours at 118° C., and then is compression molded at about 175° C. and 1,000 pounds per square inch pressure onto a flow-field mold. After thermoforming, the film has contact resistances as shown in FIG. 4. The side of the composite structure facing the glass has a higher interfacial contact resistance than the side facing away from the glass (see FIG. 4).

Example 2

Figure 5:
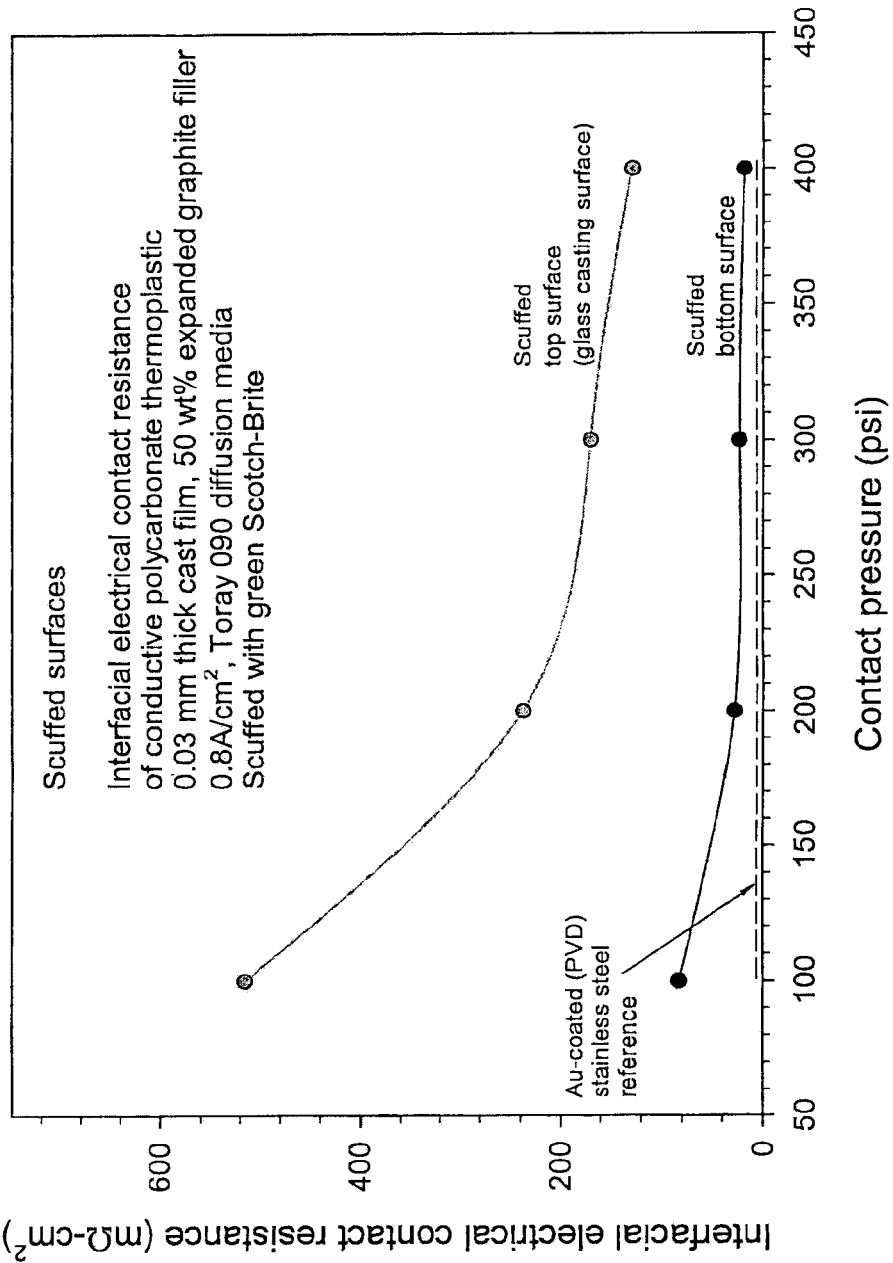
FIG. 5 illustrates the interfacial electrical contact resistance as a function of contact pressure for a polycarbonate composite bipolar plate having an abraded surface.

A polycarbonate composite structure is made in accordance to the method as disclosed in Example 1, and is further mechanically abraded on one side using an abrasive scrubbing pad. After abrading the side facing away from the glass, the interfacial electrical contact resistance drops even lower and approaches that of a vapor deposited, gold coated stainless steel plate. FIG. 5 illustrates the affect of the casting surface on the interfacial electrical resistance. As shown, scuffing the surface of the thermoformed structure clearly improves the conductivity. Similarly to FIG. 4, the surface facing the air is lower in interfacial contact resistance than the surface cast against the glass plate.

The description of the disclosure, examples, and other embodiments described herein are merely exemplary in nature and not intended to be limiting in describing the full scope of compositions and methods of this disclosure. Equivalent changes, modifications and variations of specific embodiments, materials, compositions, and methods may be made within the scope of the present disclosure, with substantially similar results.

What is claimed is:

1. A method of manufacturing a thermoplastic bipolar plate for a proton exchange membrane fuel cell, the method comprising:
   forming a resin mixture comprising a thermoplastic polymer, an electrically conductive filler material, and a solvent;
   rod coating the resin mixture onto a substrate to form a substantially flat film sheet having a first major surface and a second major surface opposite the first major surface;
   abrading a portion of at least one of the first major surface and the second major surface;
   after abrading, thermoforming the substantially flat film sheet with heat to form a thermoformed sheet;
   cutting the thermoformed sheet to form a first separator plate having a first size and a first shape and a second separator plate having a second size and a second shape; and
   joining the first separator plate and the second separator plate to thereby manufacture the thermoplastic bipolar plate so that the thermoplastic bipolar plate has an integral body.

2. The method according to claim 1, wherein the electrically conductive filler material comprises at least one of expanded graphite, gold, platinum, nickel, palladium, rhodium, niobium, titanium, chromium, rare earth metals, graphite, carbon, and compounds, alloys, and mixtures thereof.

3. The method according the claim 1, wherein the thermoplastic polymer comprises at least one of polycarbonate, polyphenylene oxide, polystyrene, polyvinyl styrene, polyvinylidene chloride, acrylonitrile butadiene styrene, polymethyl methacrylate, cellulose acetate, cellulose acetate butyrate, cellulose acetate phthalate, polyamide-imide, polyamide, polyethylene terephthalate, polyetherimide, polybutene, polypropylene, polyphenylene sulfide, polybutylene terephthalate, and mixtures thereof.

4. The method according to claim 1, wherein the solvent comprises at least one of methylene chloride, toluene, tetrachloroethane, dichloroethane, tetrahydrofuran, glyme, diglyme, and mixtures thereof.

5. The method according to claim 1, wherein joining the first separator plate and the second separator plate comprises at least one of ultrasonic welding, solvent joining, thermal staking, laser welding, and combinations thereof.

6. The method according to claim 1, further comprising preheating the resin mixture to a temperature of from about 100° C. to about 130° C. for from about 1 hour to about 3 hours to remove any moisture and/or dissolved water prior to thermoforming.

7. The method according to claim 1, wherein thermoforming the substantially flat film sheet comprises at least one of concurrently heating and vacuum molding the substantially flat film sheet; concurrently heating and pressure molding the substantially flat film sheet; concurrently heating the substantially flat film sheet and applying direct mechanical force to the substantially flat film sheet; and combinations thereof.

8. The method according to claim 1, wherein forming the resin mixture comprises ball milling the resin mixture for between about 1 hour to about 4 hours.

9. The method according to claim 1, wherein abrading comprises scuffing at least one of the first major surface and the second major surface with an abrasive scrubbing pad.

10. The method according to claim 1, wherein forming the resin mixture comprises mechanically stirring the resin mixture such that the resin mixture has a viscosity of between about 100 centipoise and about 1,000 centipoise.

11. The method according to claim 1, wherein forming comprises dissolving the resin into the solvent at a ratio of about 1 part by weight resin to 13 parts by weight solvent.

12. The method according to claim 1, further including, prior to rod coating, adding expanded graphite powder to the resin mixture.

* * * * *